United States Patent [19]

Timbs

[11] Patent Number: 5,243,593
[45] Date of Patent: Sep. 7, 1993

[54] METHOD OF ACTIVATING TANDEM DIGITAL SUBSCRIBER LINES

[75] Inventor: Jeffrey L. Timbs, Durham, N.C.

[73] Assignee: Alcatel Network Systems, Inc., Richardson, Tex.

[21] Appl. No.: 722,086

[22] Filed: Jun. 27, 1991

[51] Int. Cl.⁵ .................................... H04L 12/40
[52] U.S. Cl. ........................ 370/58.1; 370/110.1; 375/7; 375/121
[58] Field of Search ................ 178/2 R, 3, 16; 370/58.1, 58.2, 85.1, 110.1; 375/7, 36, 121; 379/258, 268, 271, 272, 278, 298

[56] References Cited

U.S. PATENT DOCUMENTS

| | | | |
|---|---|---|---|
| 3,889,067 | 6/1975 | Reed et al. | 379/271 |
| 4,122,301 | 10/1978 | Kolensky et al. | 178/3 |
| 4,959,856 | 9/1990 | Bischoff et al. | 379/258 |
| 5,119,376 | 6/1992 | Badaoui et al. | 370/110.1 |

*Primary Examiner*—Benedict V. Safourek
*Attorney, Agent, or Firm*—Ware, Fressola, Van Der Sluys & Adolphson

[57] ABSTRACT

A method for activating tandem digital subscriber lines separated by a carrier system in a communication link connecting a switch and a network termination is implemented by a microcontroller which interfaces with a digital subscriber line transceiver to extract and transmit activation request information and a programmable gate array to relay and interpret activation information conveyed across the carrier system. The microcontroller intelligently combines the activation information received from the carrier system, the activation indicator bit received from the digital subscriber line transceiver, and the transceiver status to independently activate the digital subscriber lines in a controlled sequence, so that a proper response is conveyed to the T-interface to preclude premature regarding of the physical transmission channel as being transparent. This is achieved by not setting the downstream activation bit to the network termination to 1 until each upstream digital subscriber line is fully activated in both directions.

16 Claims, 8 Drawing Sheets

METHOD OF ACTIVATING TANDEM DIGITAL SUBSCRIBER LINES

BACKGROUND OF THE INVENTION

1. Field of the Invention

The present invention relates to Integrated Services Digital Networks (ISDN) and more particularly, to a procedure for the activation of tandem digital subscriber lines (DSL) which are separated by carrier systems of the type employing the 3-DSO Time Division Multiplexing (3-DSO TDM) method of ISDN Basic Rate Transport.

2. Description of the Prior Art

ISDN provides a wide-range of voice and non-voice services within the same network, using a limited set of connection types and multi-purpose user-network interface arrangements. ISDN specifications provide for basic access services known as 2B+D. This system provides for two B channels of 64 Kbit/s and one D channel carrying 16 Kbit/s for data transmission. These channels are clear channels fully available to the customer for transmission of information such as voice calls, circuit switched data or packet-switched data. Overhead is transmitted using additional bandwidth in an overhead channel which contains 'indicator bits' that specify actions to be taken by various network elements.

The link between an ISDN switch, exchange termination (ET) or a remote digital terminal and the ISDN user is a critical component in the end-to-end digital path. Since a majority of potential users are presently served by a single twisted pair of telephone wires, full-duplex service at rates sufficient to accommodate ISDN basic access must be provided over this single pair. A DSL that provides the required link using a single pair of wires is specified in the May 1, 1990 Draft Addendum to ANSI T1.601-1988, entitled, "Integrated Services Digital Network (ISDN)—Basic Access Interface for Use on Metallic Loops for Application on the Network Side of the NT (Layer 1 Specification)", which document is incorporated herein by reference.

The data transmitted over the DSL requires a 2B1Q line code, which is a four-level pulse amplitude modulation code without redundancy. The line code groups pairs of binary digits into two-bit fields for conversion to quaternary symbols, which are called 'quats'. In each pair of bits formed, the first bit is called the 'sign bit' and the second is called the 'magnitude bit'. Thus, there are available two magnitudes, each at a positive or negative value, for a total of four levels for each quat.

The information flowing across an interface to the DSL is arranged in frames and superframes. Each frame has a 1.5 ms duration and comprises a sync word having nine quats, or 18 bits, 12 2B+D user data channels comprising 108 quats, or 216 bits, and an overhead channel known as the M channel, comprising three quats, or six bits. The overhead channel bits are known as the maintenance bits, or M-bits. The frames are organized into superframes comprising eight frames and having a duration of 12 ms. The first frame in the superframe is identified by inverting the polarity of the sync word in the first frame. As previously mentioned, each frame has six overhead or M-bits; therefore, each superframe is provided with 48 M-bits for control of the system.

The 48 M-bits are identified using two subscripts, such as $M_{ij}$, wherein 'i' indicates the basic frame number of the superframe, and 'j' indicates the M-bit within the basic frame. One such maintenance bit is identified as $M_{14}$ and is known as the activation (ACT) bit. This bit plays a key role in establishing the ISDN basic access service capability, in that it indicates the readiness or lack thereof of layer 1 to support higher layer communication over the entire access. ACT bits are used in both directions by DSLs in the startup process, with the transition from 0 to 1 indicating transparency. In the network termination-to-network, upstream, direction, the ACT bit remains set equal to zero until the customer equipment is ready to transmit. When the customer equipment is ready to transmit, this progress indication is indicated by a transition of the upstream ACT bit from 0 to 1. After an ACT=1 is received from the network termination (NT), the ET sets the downstream ACT bit equal to 1 to communicate its readiness and transmits this back to the NT. Once ACT bits equal to 1 are achieved in both directions, the ET and NT are ready for layer 2 communications.

Appendix C of ANSI T1.601-1988 dated May 1, 1990 describes in detail the required activation process for an ISDN connecting an ET to an NT.

Bellcore Technical Reference TR-TSY-000397 Issue Oct. 1, 1988, entitled, "ISDN Basic Access Transport System Requirements", which is incorporated herein by reference, describes the functional and operational aspects needed to define a loop transmission system built around a pair of DSL transceivers which connect one end of a DSL to a line unit (LT) of an ET or an LT-like line unit (LULT), and the other end of the DSL to a line unit of an NT or to an NT-like line unit (LUNT).

When ISDN basic access is to be multiplexed over a higher rate digital transmission facility, the 3-DSO TDM method may be utilized, wherein three DSO channels of the carrier system are utilized for transparent transportation of the B1, B2 and D channels. The DSL overhead is contained in the third DSO channel, along with the ISDN D channel.

In situations where tandem DSLs are used in an access configuration and in particular, where the DSLs are separated by a carrier system, special care must be taken to properly convey ACT bit information status between the ET and the NT, since carrier systems introduce one or more additional facility segments. Tandem DSL systems, separated by an intervening carrier facility, must both be started up before ACT bit confirmations reach the ET and the NT. The necessity of relaying DSL 'activation request' indication information, ACT bits, (as defined by ANSI T1.601-1988, Appendix C) across the carrier system was left for further study by Bellcore and ANSI. The resolution of this problem is critical to proper startup of tandem DSL systems and proper ACT bit indications.

SUMMARY OF THE INVENTION

The present invention contemplates an activation procedure implemented by a microcontroller (MCU) which interfaces with both a DSL transceiver for processing activation request information pertaining to a DSL interface and a programmable gate array (PGA) for extraction and insertion of activation request information pertaining to a carrier system interface.

The MCU-to-DSL transceiver interface permits a mechanism for receiving the status of the DSL's progress towards starting-up to achieve physical layer transparency in both directions and for responding to the start-up states by transmitting commands that control the progression through logical states to achieve layer 1 start-up and transparency.

The MCU-to-PGA interface permits a mechanism for receiving the status of a remote DSL start-up and transparency progress and for relaying the status of the local or near-end DSL start-up and transparency status to a remote or distant network element across the carrier system transmission facility.

The MCU interprets the activation status received from the DSL and from the carrier system interface according to a particular algorithm to establish a proper response to the local DSL transceiver for control of the activation status across the DSL and to the distant network element for control of the activation status across the carrier system transmission facility.

A line unit may be provisioned by user-settable switches to function as either a LULT or a LUNT and may therefore terminate either end of the DSL segment. A LULT provides an upstream DSL termination and is located in a carrier system network element closer to the customer. A LUNT provides a downstream DSL termination and is located in the carrier system network element closer to the ISDN switch.

Depending upon which end of the DSL segment is terminated by the carrier system line unit, the MCU executes a particular procedure for interpretation and control of the activation status across the DSL and the carrier system transmission facility.

Subject to the provisioning of the line unit, the MCU onboard the line unit recognizes whether information received from the DSL represents a downstream activation status of the DSL if the line unit is provisioned as a LUNT, or upstream activation status of the DSL if the line unit is provisioned as a LULT. Thus, the DSL transceiver conveys status concerning only the receive direction of the DSL. In a like manner, based upon the line unit's provisioned states, the MCU interprets information received from the carrier system transmission facility via the PGA as conveying either downstream or upstream activation status of the distant network element.

Once the end termination function is established, the corresponding activation procedure is executed by the MCU to provide the proper sequence for monitoring and updating status information over both the 3-DSO interface and the local DSL interface. The particular activation procedure provides the correct action in response to a start-up request which may be initiated either by the customer from the NT or by the network from the LT or ISDN switch, ET.

The activation procedure executed by the MCU monitors the activation bit received from the distant network element by the PGA once per superframe for an initial 0-to-1 transition, indicating a request for activation from the distant network element. If no transition is detected, the MCU monitors the activation status received from the DSL transceiver for an activation request from the near-end DSL. The procedure will 'loop' in these two states continuously upon application of power to the unit. Detection of an activation request from either interface causes the procedure to branch to another state; however, priority is given to the customer upstream direction regardless of which end of the DSL is terminated by the line unit. Either the network or the customer may request activation of the basic access link; hence, upon detection of an activation request, the procedure decodes which direction originated the activation request to decide the course of action to be taken.

The activation procedure proceeds to convey the correct status across the carrier system interface to the far-end network element and to the local DSL transceiver to permit independent start-up of each tandem DSL separated by the carrier system while ensuring the proper status of the downstream activation bit is conveyed to the user at the user's T-interface so as to preclude a premature indication that the physical transmission layer is ready to provide transparent communication across each transmission segment forming the link from the ISDN switch to the user. This procedure achieves that purpose by not allowing the downstream activation bit toward the NT to be set to '1' until each upstream DSL is fully activated in both directions.

It is an object of the present invention to assure that in ISDN systems, comprising tandem DSLs separated by a carrier system, that each DSL is activated before the activation bit confirmation reaches the ET and the NT.

DETAILED DESCRIPTION OF THE PREFERRED EMBODIMENT

Figure 1:
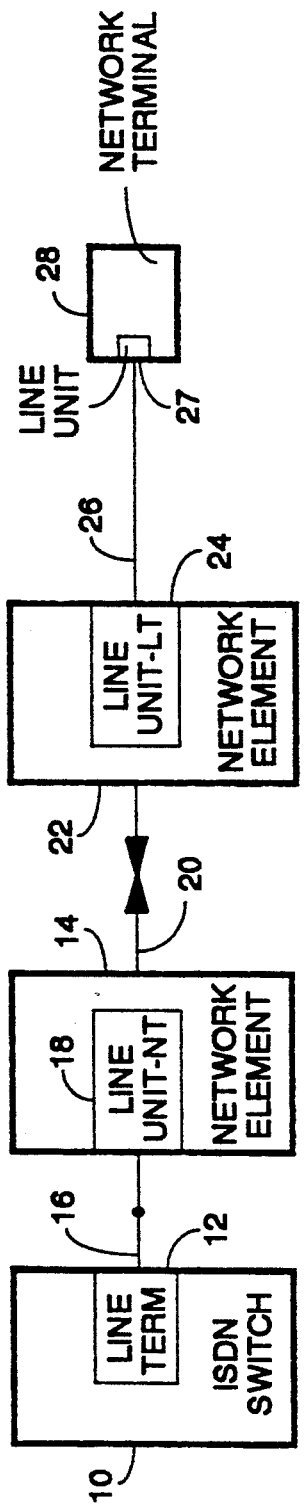
FIG. 1 is a block diagram of an ISDN basic access transmission system having a carrier employing the 3-DSO TDM method.

Referring to FIG. 1, there is shown an ISDN system in which the present invention may be practiced. An ISDN-equipped exchange, ET, includes an ISDN switch 10 having a line termination (LT) 12 in the form of a line unit, said LT 12 being connected to a network element (NE) 14, such as a central office terminal (COT) or a channel bank via a two-wire twisted metallic pair 16 forming a DSL. Pair 16 is connected to an NT-like line unit 18 (LUNT) which is part of the NE 14. In the event that a COT is used, the pair 16 is actually part of the distribution frame of the central office. NE 14 is connected via a digital carrier system transmission facility 20, such as a digital loop carrier to another NE 22 which may be a remote digital terminal or a channel bank. The NE 22 includes an LT-like line unit (LULT) 24 for interfacing with a DSL 26, which comprises a twisted metallic pair connected to a line unit 27 of a network terminal (NT) 28 which is part of the customer premises and includes at a downstream end the T-interface.

The digital carrier 20 utilizes the 3-DSO TDM method, wherein any three DSO (64 Kbit/s) timeslots on a channelized byte-oriented DS1 or higher rate facility are used. The 3-DSO TDM requires only that the carrier system have the capability to allocate three DSO channels for use with the 3-DSO TDM method. The three DSO timeslots are utilized to transmit the bytes of the B1, B2 and D channels. The D channel utilizes 16

Kbit/s of the D+ byte for data transmission and 4 Kbit/s for the 48 M-bits of in the DSL superframe.

The DSL transmission format is organized into 1.5 ms basic frames, each starting with a synchronization word and containing six M-channel bits in addition to the 2B+D data channels. Eight basic frames comprise a DSL superframe, which is identified by the inversion of the synchronization word of the first basic frame of the superframe. Thus, 48 M-channel bits are transmitted in each 12 ms superframe, providing 4 Kbit/s of the DSL for M-bits.

The 4 Kbit/s M-bit channel in the DSL superframe is transmitted across the digital carrier in a single overhead (OH) bit of the 64 Kbit/s 'D+' channel. One bit of the D+ channel provides an 8 Kbit/s OH channel for transport of a 4 Kbit/s DSL M-bit channel and a 4 Kbit/s DSL superframe timing channel. The channels are transmitted half-time so that the OH bit in the D+ channel conveys an alternating, superframe timing/M-bit, bit pattern. The 4 Kbit/s DSL superframe timing channel permits location of the 48 M-bit positions within the 8 Kbit/s OH channel for access to particular M-bits by the MCU. The 4 Kbit/s DSL superframe timing channel includes a superframe marker, logic '1', which specifies the beginning of the DSL superframe being transmitted by the 3-DSO TDM method, followed by 47 zeros. The 4 Kbit/s DSL M-bit channel consists of the 48 M-bits defined for the DSL M-channel. The transmission of the M-bits via the D+ channel is fully described in Bellcore TR-TSY-000397, Issue 1, October, 1988.

The ACT bit, which is transmitted as the fourth M-bit in the first basic frame of a superframe, plays a key role in establishing the ISDN basic access service capability, in that it indicates the readiness, or lack thereof, of layer 1 to support higher layer communication over the DSL. However, the ACT bit which is transmitted across the 3-DSO interface via the OH channel of the D+ byte serves a different purpose. Since the layer 1 readiness of the higher rate transmission facility is always available after the superframe marker has been detected and the line unit is synchronized, the ACT bit provides an indication of the layer 1 status of both DSLs separated by the carrier system transmission facility. Thus, the 3-DSO ACT bit state conveys activation request information in both directions. The conveyance of activation request information in both directions permits independent detection of an activation request from either line unit 12 or 27 by both line units 18 and 24. The detection of an activation request enables the MCUs residing in the line units 18, 24 to activate the associated DSLs 16, 26 under control of an activation procedure corresponding to the direction from which the request was received and whether the line unit is provisioned as a LUNT or LULT and to convey progress of each activation status toward the opposite end by transitions of the activation bit via the 3-DSO.

Within a single DSL, the bidirectional activation bit conveys an acknowledgement from the T-interface of the NT to the ET and an acknowledgement from the ET is provided back to the T-interface that layer 1 has been established over the entire access configuration, and that establishment of layer 2 processing can begin. This process is fully described in the May 1, 1990 draft addendum of ANSI T1.601-1988 Appendix C. Thus, unless special care is taken, an activation initiated by ET 10 could be responded to by the LUNT 18, causing the ET 10 to believe that the entire access has become transparent. In view of the above, it is necessary that the line units 12, 18, 24 and 27 be constructed and programmed so as to avoid a premature indication of transparency. The line units must provide a means to relay the activation request indication information across the carrier system 20 downstream to the DSL 26, so that both DSLs 16 and 26 are started before confirmations are delivered to the ISDN switch of ET 10 and the NT 28.

Figure 2:
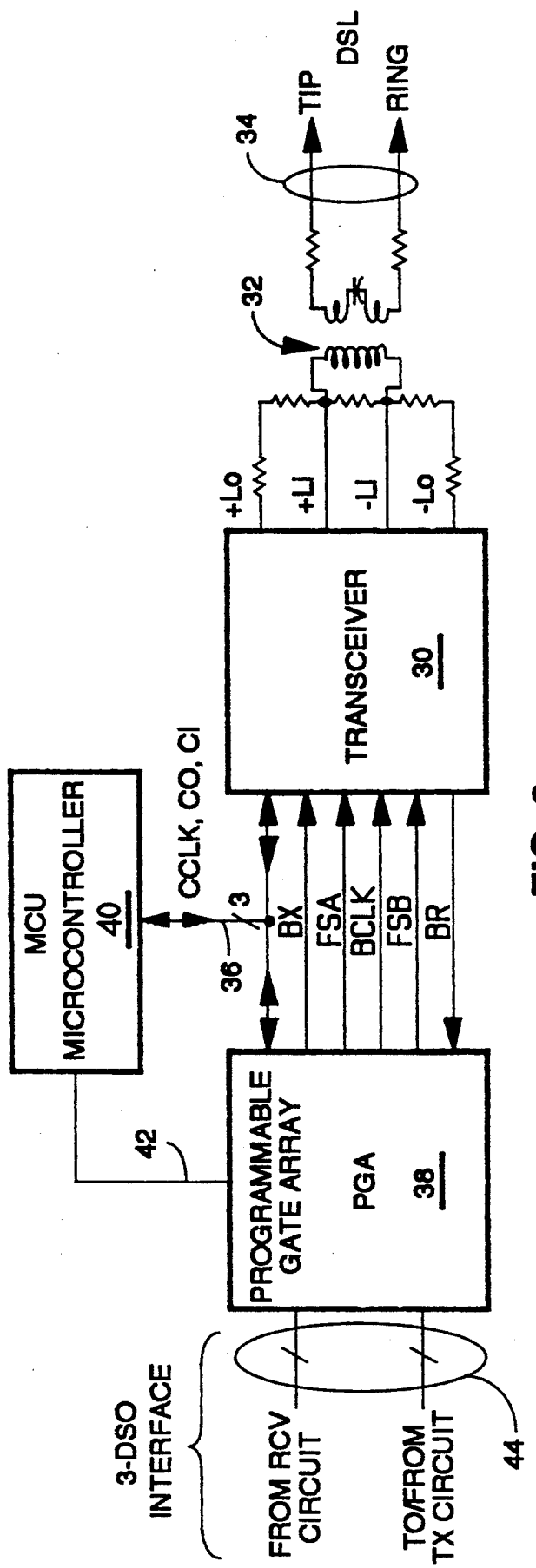
FIG. 2 is a block diagram of a portion of a line unit used to practice the present invention.

In order to achieve the desired results, the line units 12, 18, 24 and 27 are constructed to include circuitry as shown in FIG. 2. Referring to FIG. 2, there is shown a block diagram of a line unit used to practice the present invention. The line unit utilizes a transceiver 30, commonly referred to as a U-chip which in the present embodiment was selected to be a National Semiconductor TP3410 ISDN Basic Access Echo-Canceling 2B1Q U Transceiver. This transceiver was selected because it was designed for ISDN basic access. However, it is to be understood that the TP3410 merely serves as a basis for describing the invention, and that the invention is by no means limited to the use of this particular manufacturer's chip. The TP3410 is a complete monolithic transceiver which may terminate either end of the U-Interface to permit ISDN basic access data transmission over the DSL. The chip is fully compatible with the May 1, 1990 Draft Addendum of ANSI T1.601-1988. For a fuller understanding of the structure and operation of the TP3410 chip, the description found in the National Semiconductor Telecommunication Databook, pages 2-21 et seq. should be referred to. This description is incorporated herein by reference.

Outputs +Lo, +Li, −Li and −Lo of the transceiver are connected through a transformer 32 to a twisted metallic pair 34 of a DSL. The transceiver includes a MICROWIRE port having an output and input connected via a bus 36 to a PGA 38 and an MCU 40 for interchanging a MICROWIRE control channel clock input, CCLK, a MICROWIRE control channel data input, CI, and a MICROWIRE control channel tri-state output for status information, CO. The transceiver is further connected to the PGA 38 for receiving a bit clock, BCLK, a transmit frame sync, FSA, and a receive frame sync, FSB. The transceiver receives data on input BX and transmits data on output BR.

A control bus 42 connects the PGA 38 with the MCU 40 and allows the MCU to read/write bit 5 of the D+channel of the 3-DSO TDM format on a carrier system. Bit 5 carries the M-bits which alternate in a pattern with 0-bits. The MICROWIRE interface on bus 36 allows the MCU to write commands to and read interrupts from the transceiver 30. The MCU controls the state of the ACT bit transmitted across the DSL via the MICROWIRE interface functioning in conjunction with the transceiver 30.

In order to control the state of the ACT bit as transmitted by the transceiver 30 across a DSL, a command is written by the MCU 40 to the transceiver via a 16-bit, two byte serial transfer. The MCU 40 writes the address of the transceiver's Activation Control Register which is 0100 0100. The MCU 40 then writes the command opcode to the transceiver 30. The opcode for causing a 0-to-1 transition of the transmitted DSL ACT bit is 0000 1100. The opcode for causing a 1-to-0 transition of the transmitted DSL ACT bit is 0000 100. The same address and opcodes apply regardless of whether the transceiver 30 is located on LUNT 18 or LULT 24. The opcodes control only the ACT bit which is transmitted over the DSL.

When the state of the DSL ACT bit received by the transceiver 30 transitions, the transceiver 30 issues an interrupt signal to the MCU 40. Upon detection of the interrupt, the MCU 40 reads an address from the transceiver 30 via a serial bus read operation. The MCU 40 reads the data from the transceiver 30 via a second serial bus read operation. An address of 0100 0100 indicates that the interrupt was caused by the transceiver's Activation Control Register. If a 0-to-1 transition of the DSL ACT bit received by the transceiver 30 has been detected, the transceiver 30 will put 0000 1100 as an AI Indication, interrupt, in the data byte. If a 1-to-0 transition of the DSL ACT bit received by the transceiver 30 has been detected, the transceiver 30 will put 0000 0100 in the data byte for an EI Indication, interrupt. The transceiver 30 generates an interrupt only upon detection of transitions in the received DSL ACT bit. The indication data bytes are the same regardless if the transceiver 30 is located on LUNT 18 or LULT 24.

The PGA 38 is connected to circuitry of the channel bank and provides the 3-DSO TDM interface 44.

The PGA 38 is an Actel 1020 Field Programmable Gate Array, which has the necessary features to satisfy the needs of the present invention. The MCU 40 is a Motorola MC68HC705C8 Micro-Controller unit.

Figure 3:
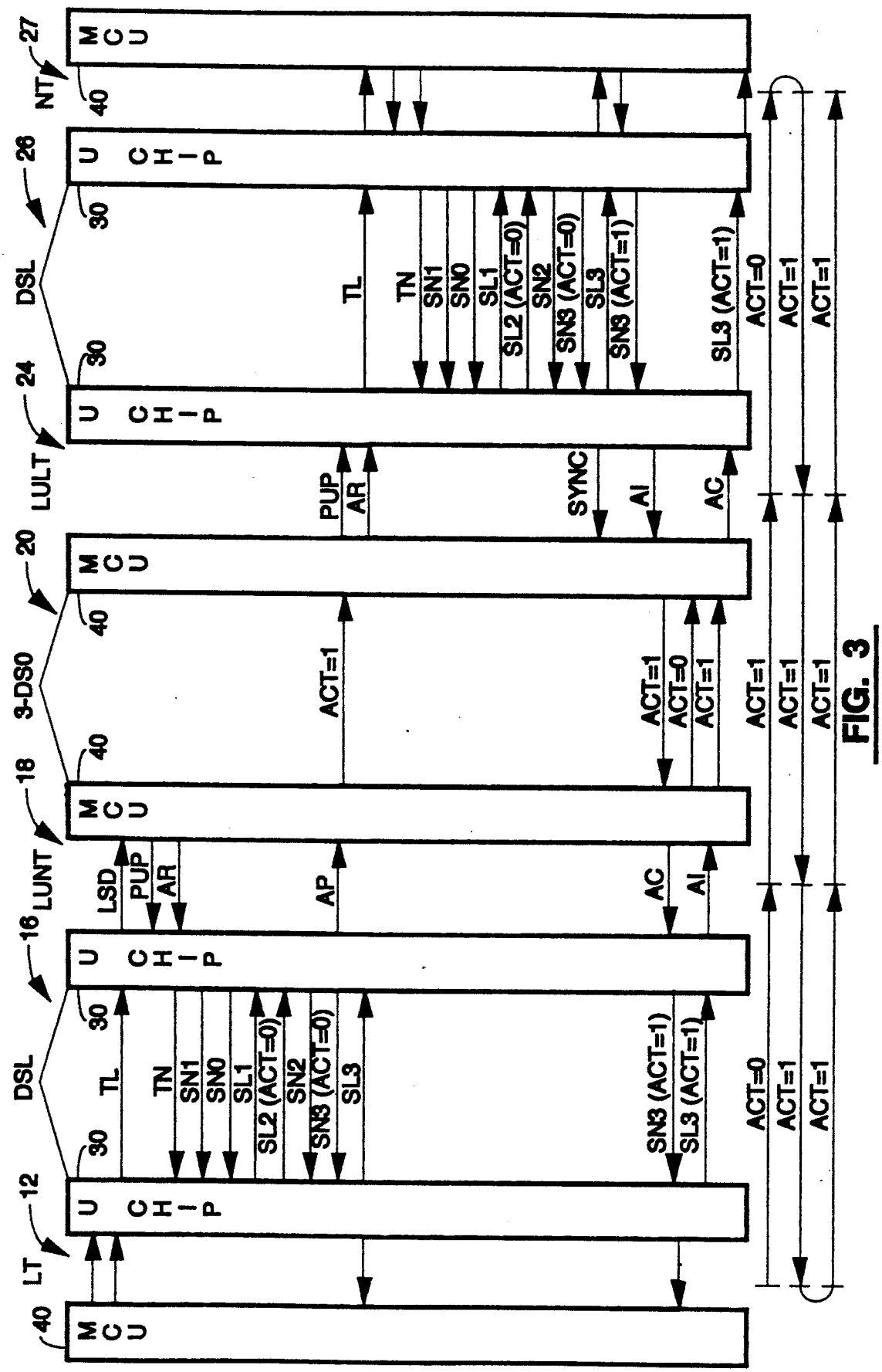
FIG. 3 is a diagrammatic illustration of the startup procedure of the present invention when startup is initiated by an exchange.
Figure 4:
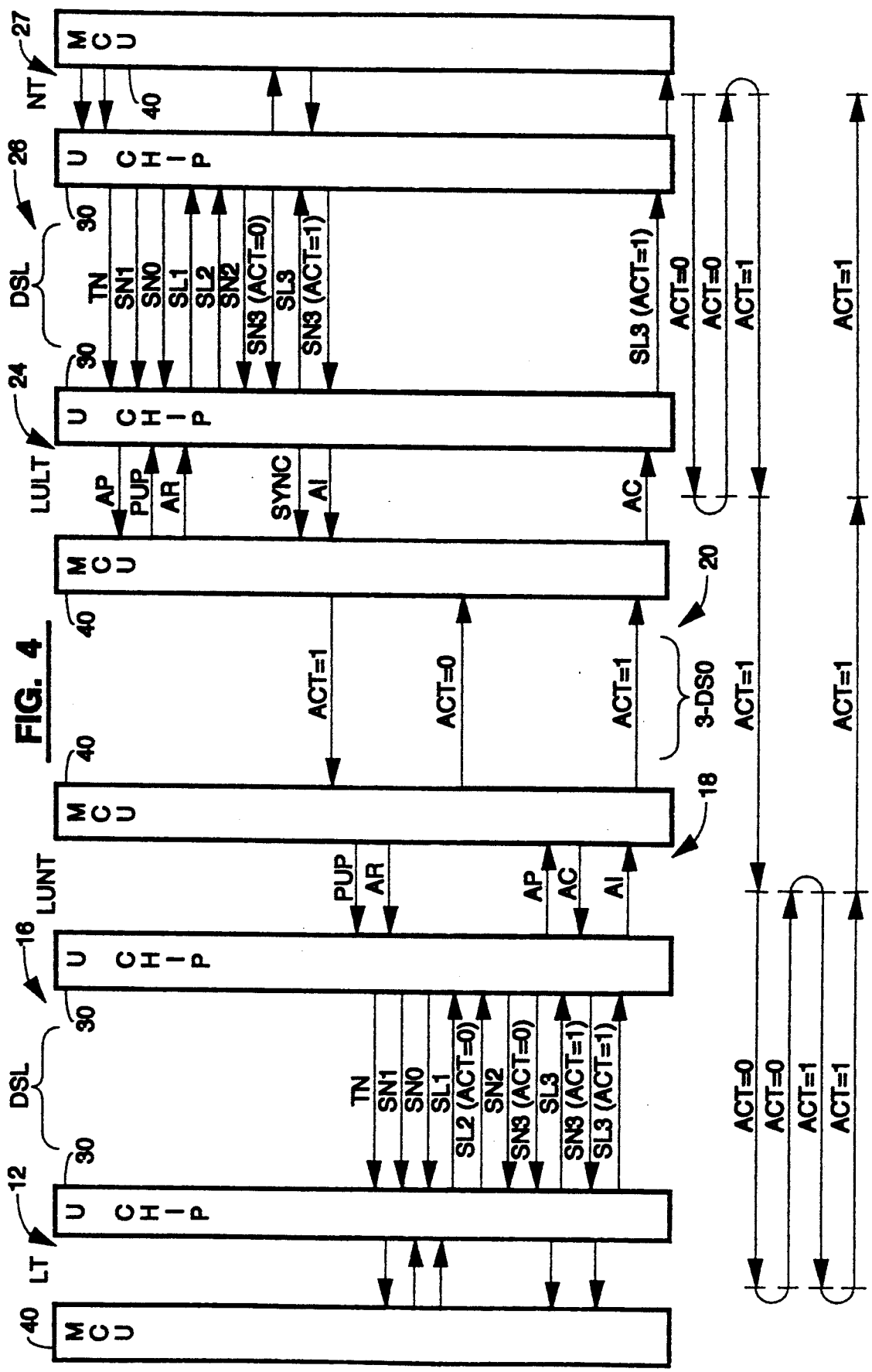
FIG. 4 is a diagrammatic illustration of the startup procedure of the present invention when startup is initiated by the customer.

Referring to FIGS. 3 and 4, there are shown the startup procedures used when activation is initiated by the ET and by the NT respectively. The four line units of FIGS. 1 and 2 are illustrated as comprising only a MCU 40 and a transceiver, or U-chip 30. The PGA 38 of FIG. 2 is not shown in FIG. 3.

The MCUs 40 provide commands to the U-chips 30 and respond to interrupts to control the activation process, so that the DSL activation may occur in concert with information exchanged over the 3-DSO TDM carrier 20. Firmware resident in the MCU 40 and in the associated hardware of the PGA 38 controls the state of the activation indicator bits transmitted across the 3-DSO TDM format and the DSL. The state of this bit must be considered, along with the local status of the respective DSL transceiver for proper control of the activation procedure.

In FIGS. 3 and 4, time begins at the top and increases as the procedure moves downwardly. No attempt has been made to illustrate the absolute time required to perform each task. Arrows flowing from an MCU towards a U-chip represent commands sent from the MCU to the U-chip. Arrows flowing from the U-chip toward the MCU represent interrupts generated by the U-chip which are read by the MCU to ascertain the local status of the U-chip. Arrows flowing across either DSL represent the direction of signals exchanged by the DSL transceivers during startup. Arrows flowing between the LUNT 18 and the LULT 24 represent the ACT bit transported in either direction in bit 5 of the D+ byte of the 3-DSO TDM format.

The actual logical state of the ACT bit which appears in either direction of either the DSL or the 3-DSO transmission segment is '0' from time zero, as represented in FIGS. 3 and 4. At the point in time when the logical state of the ACT bit in either direction transitions to the opposite logical state, the transition is expressed by specifying the opposite state, e.g., ACT=1 indicates the point at which the ACT bit transitions from a logic '0' state to a logic '1' state. After the logical transition of the ACT bit state, as indicated in FIGS. 3 and 4, the state of the ACT bit is assumed to remain in said state until another transition is indicated. The expression of a logical transition is indicated only for the direction specified by the arrows; no transition occurs in the ACT bit in the opposite transmission direction as the result of a transition on the ACT bit indicated on either the DSL or the 3-DSO transmission segments.

The ACT bit flow illustrates how the downstream and upstream ACT bit conditions are combined with the activation requests transmitted across the 3-DSO TDM link to convey the proper ACT bit status to either the ET or the NT.

The states of the activation bits transmitted across the DSLs and the 3-DSO TDM carrier during the entire activation sequence are indicated at the bottoms of FIGS. 3 and 4. It should be noted that the activation bit in the downstream direction towards the NT is never set high until the upstream DSL is fully activated in both directions. Only at this point is the final downstream activation bit set high to allow activation of the entire system to be completed.

For convenience, the signal names used across each DSL coincide with the abbreviations set forth in Table 5 and in FIG. C-2 of the May 1990 Draft Addendum of ANSI T1.601-1988. The commands and interrupts exchanged between the MCU and the associated U-chip are based on those used in the National Semiconductor TP3410 Transceiver and may be found in the National Semiconductor Telecommunications Data Book at pages 2–42 and 2–43.

Referring to FIGS. 3 and 4, it should be noted that the downstream ACT bit is not set equal to 1 across the DSLs from the LT to the LUNT until the LT has received an upstream activation bit equal to 1, whereas the downstream ACT bit is not set equal to 1 across the DSL from the LULT to the NT until the LULT has received an upstream activation bit equal to 1 and a downstream activation bit across the 3-DSO segment equal to 1, regardless of whether startup has been initiated by the ET or by the NT.

Figure 5:
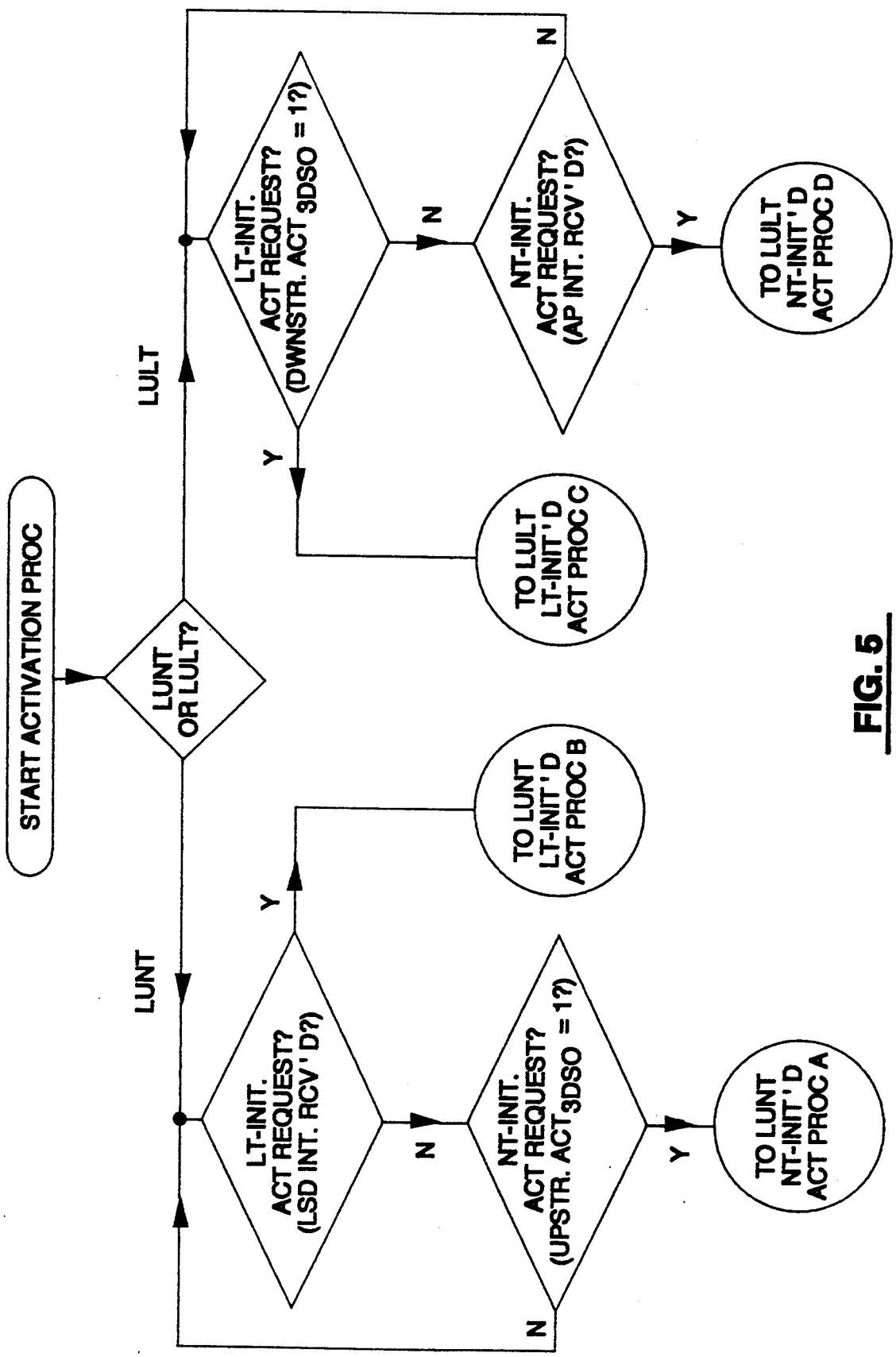
FIGS. 5-9 are flow charts illustrating routines performed by the MCU.

Referring to FIG. 5, there is shown a flow chart illustrating the initial activation routine performed by the MCU, wherein a line unit decodes whether it is a LULT or a LUNT and determines whether an activation request is coming from the DSL or the 3-DSO link. Depending upon the determination made, the MCU either loops back and repeats the initial routine or initiates one of four sub-routines identified as A, B, C and D, which are illustrated in FIGS. 6, 7, 8 and 9 respectively.

Figure 6:
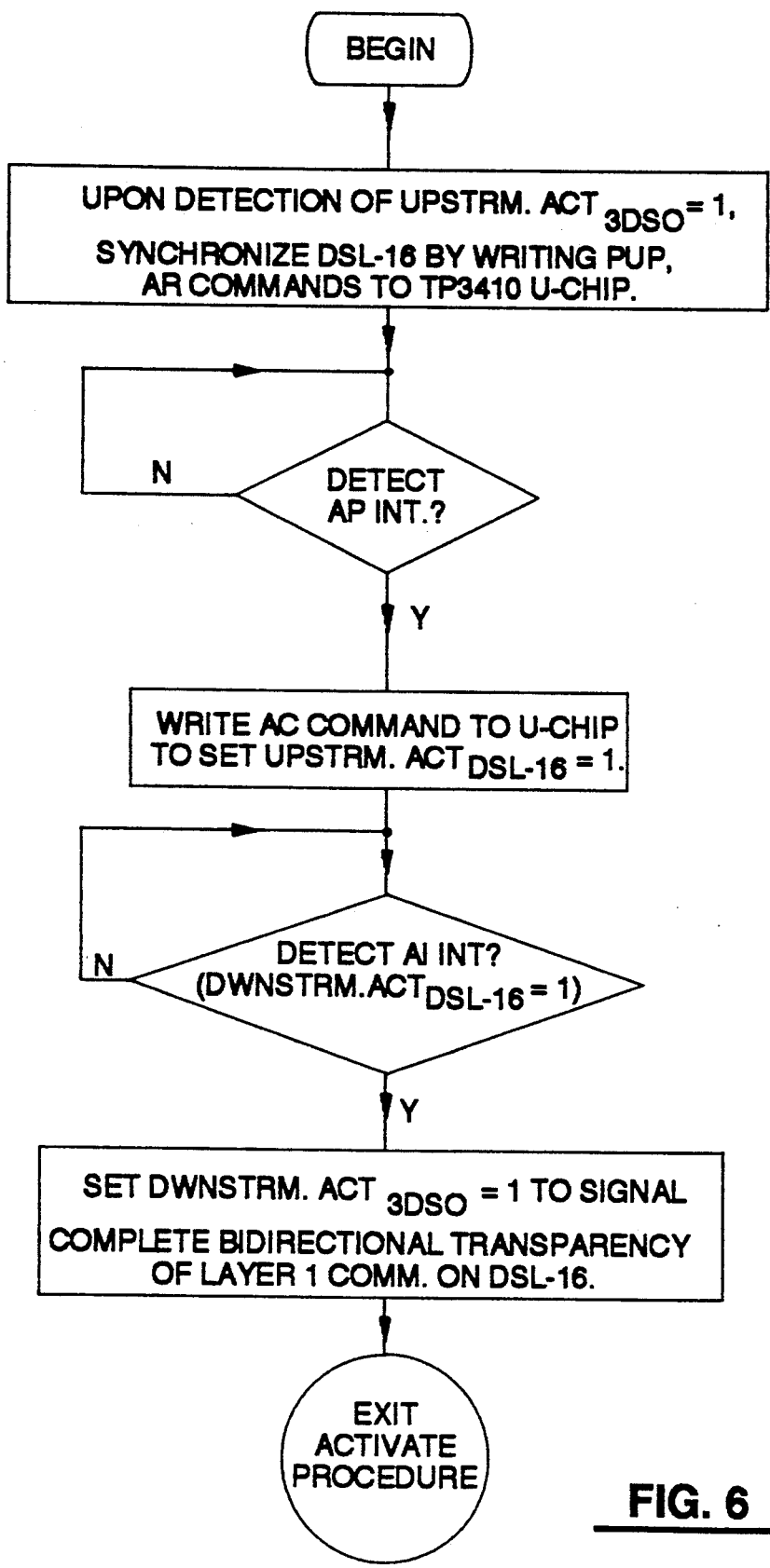

FIG. 6 is a flow chart illustrating the MCU sub-routine initiated for a LUNT when the NT has initiated activation.

Figure 7:
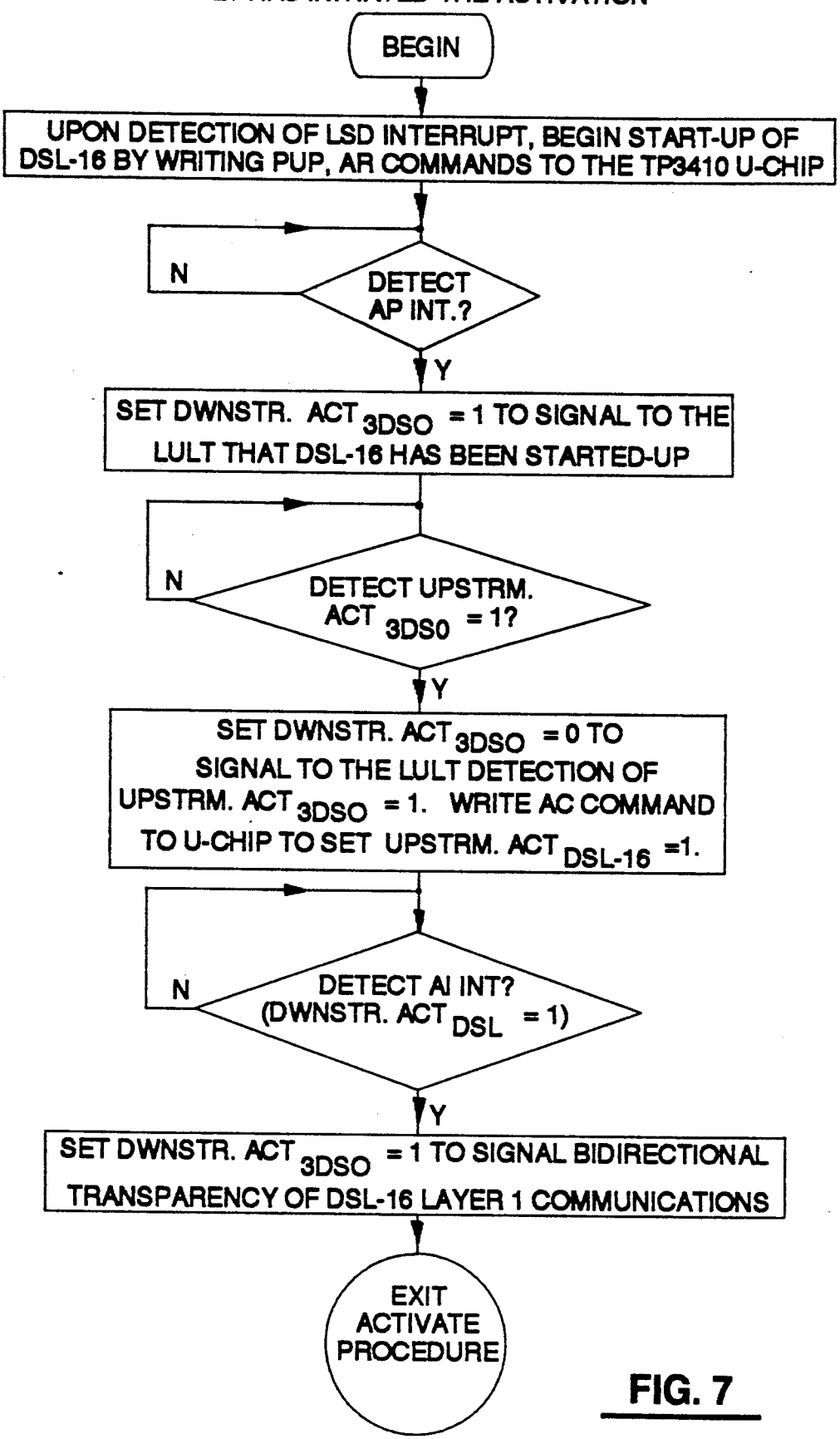

FIG. 7 is a flow chart illustrating the MCU sub-routine initiated for a LUNT when the LT has initiated activation.

Figure 8:
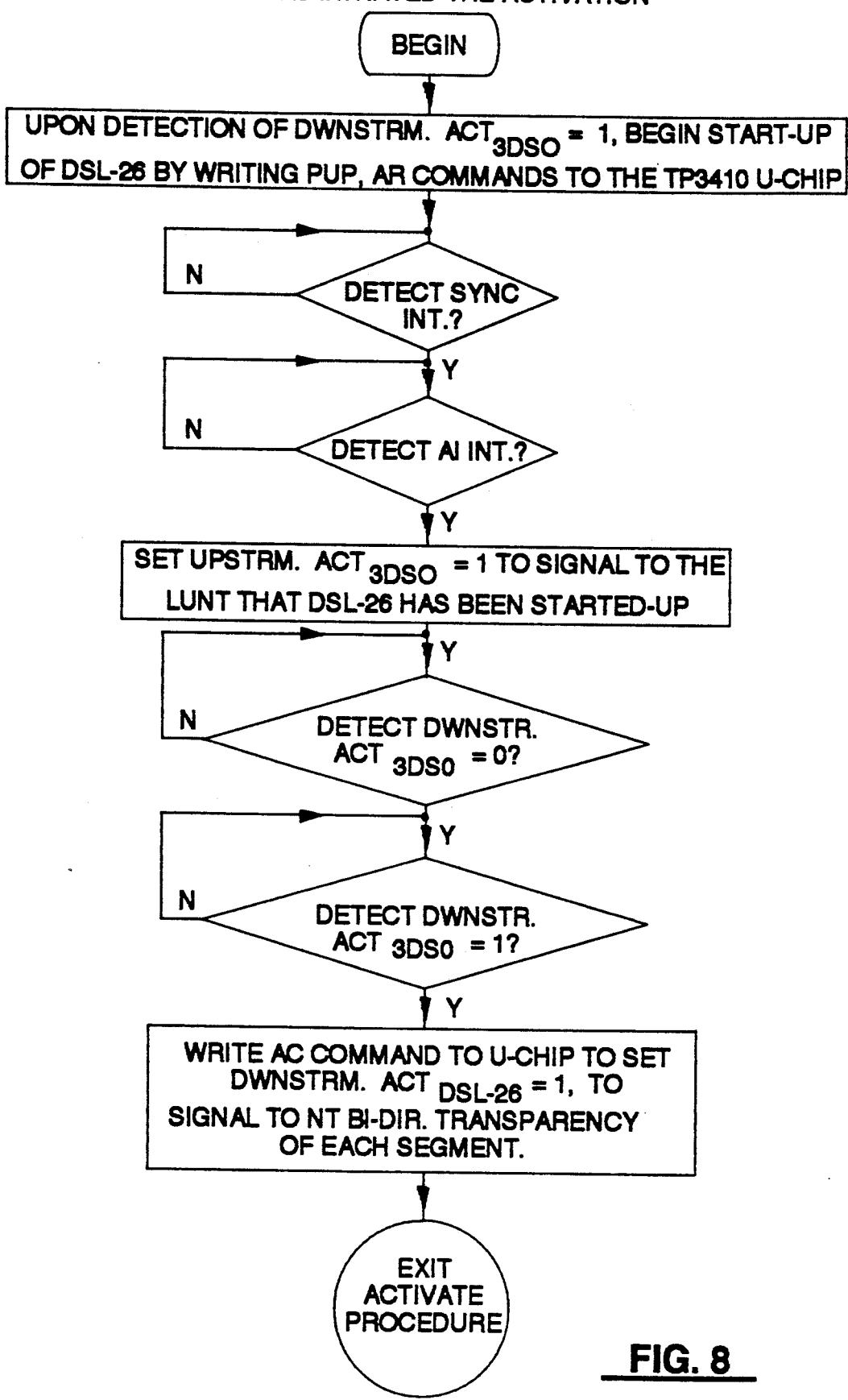

FIG. 8 is a flow chart illustrating the MCU sub-routine initiated for a LULT when the LT has initiated activation.

Figure 9:
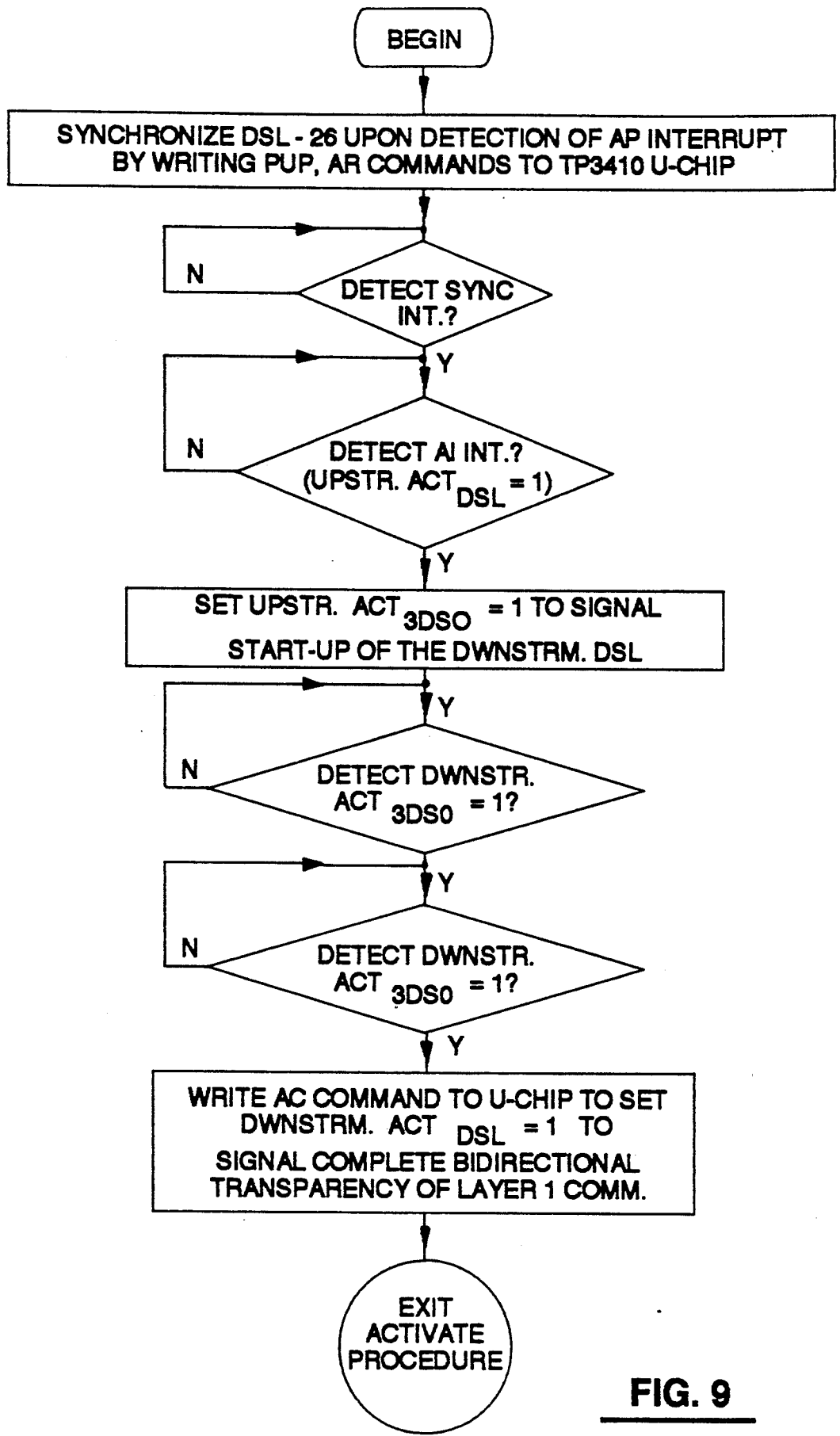

FIG. 9 is a flow chart illustrating the MCU sub-routine initiated for a LULT when the NT has initiated activation.

Referring specifically to FIG. 3, activation is initiated by the MCU 40 of the LT line unit, which issues a power-up command and thereafter an activation request. In response to the activation request AR, the U-chip 30 sends a wake-up tone TL across DSL-16, which tone is received by the U-chip 30 of LUNT 18. In response to the wake-up tone the U-chip 30 sends to MCU 40 of LUNT 18 a line signal detect, LSD, interrupt. The MCU 40 of LUNT 18 then issues a power-up command PUP to its associated U-chip 30 and immediately thereafter an activation request AR command. In response to the activation request command, the U-chip of LUNT 18 sends a wake-up tone TN across the DSL-16 to the U-chip 30 of LT 12. Subsequent to the wake-up tone TN, the U-chip of LUNT 18 transmits two pulse patterns SN1 and SN0 across the DSL to the U-chip 30 of LT 12.

In response to the pulse patterns, the U-chip 30 of LT 12 transmits first an SL1 pulse pattern and thereafter an SL2 pulse pattern. After SL2, the DSL is synchronized and M-bits may be processed by the U-chip. Until this point in time, the activation bit in either direction across the DSL is not processed by either U-chip terminating the DSL. So, the state of the activation bit across the DSL is indeterminate up until this point in time. With the issuance of the SL2 signal by the U-chip, the DSL activation bit in the direction of transmission of the SL2 signal becomes valid and will be set to logic '0'. In response to the SL2 pulse pattern with the downstream activation bit equal to 0 across DSL 16, the U-chip 30 of LUNT 18 transmits pulse patterns SN2 and SN3 upstream to the U-chip of LT 12. Simultaneously, U-chip 30 of LUNT 18 transmits an interrupt Activation Pending interrupt AP to the microcontroller 40 of LUNT 18.

In response to the AP interrupt, microcontroller 40 of LUNT 18 causes a transition in the downstream activation bit to be transmitted across the 3-DSO link from logic state '0' to logic state '1'. The transition in the downstream activation bit from a '0' to a '1' across the 3-DSO link is detected by the MCU 40 of the LULT 24. The object of the algorithm in MCU 40 is to process the downstream activation bit received from the 3-DSO link in order to detect the correct transitions in ACT bit state before propagating the final downstream activation bit 0-to-1 transition across the DSL 26 toward the NT.

The microcontroller 40 of LULT 24 response to the initial 0-to-1 transition in the activation bit received over the 3-DSO 20 by initiating a start-up sequence similar to that carried out between the line units of DSL 16.

However, once the NT 27 detects the SL3 signal across the DSL 26 and the NT is ready for communication, the NT 27 provides an SN3 pulse pattern upstream to the LULT 24 with the upstream DSL activation bit set to 1 to start-up DSL 26. U-chip 30 of LULT 24 detects the transition in the upstream DSL 26 activation bit state from a logic '0' to a logic '1' and generates an activation indication AI interrupt to microcontroller 40 of the LULT 24. The LULT 24 in response to the AI interrupt causes a logical transition in the state of the upstream 3-DSO activation bit from a '0' to a '1' over the 3-DSO link to the MCU 40 of LUNT 18.

MCU 40 of LUNT 18 responds with an activation complete AC command to the U-chip 30 of LUNT 18 and further responds by causing a transition in the downstream 3-DSO activation bit from a logic '1' to a logic '0'. The purpose of transmitting a downstream 3-DSO activation bit equal to '0' upon issuance of the AC command by the MCU 40 of LUNT 18 toward the U-chip 30 is to permit the MCU 40 of LULT 24 to identify when the upstream DSL between the LT and the LUNT has been started up, which is communicated to the MCU 40 of LULT 24 by a final transition in the downstream 3-DSO activation bit from a '0' to a '1'.

The activation complete AC command given by MCU 40 of LUNT 18 to the U-chip 30 causes the U-chip to transmit over DSL 16 a pulse pattern SN3 with the upstream activation bit equal to '1', which is received by the U-chip 30 of LT 12. U-chip 30 of LT 12 transmits downstream an SL3 pulse code with the downstream activation bit set to '1' over DSL 16. The U-chip 30 of LUNT 18 detects the 0-to-1 transition in the downstream DSL 16 activation bit concurrent with reception of the SL3 pulse code and in response generates an Activation Indication AI interrupt signal to MCU 40 of LUNT 18. The MCU 40 of LUNT 18 detects the AI interrupt and causes the final 0-to-1 transition in the downstream 3-DS activation bit to be transmitted to MCU 40 of LULT 24. The MCU 40 of LUNT 18 sets the downstream activation bit for the final 0-to-1 transition across the 3-DSO only when the following three conditions are present at the LUNT 18:

1. An upstream activation bit equal to '1' is being received from the 3-DSO;
2. An upstream activation bit equal to '1' is being transmitted across DSL 16;
3. A downstream activation bit equal to '1' is being received from the DSL 16.

Hence, the downstream activation bit across the 3-DSO transmitted by the MCU 40 of LUNT 18 is the result of a logical AND operation of the local DSL status and the received upstream 3-DSO activation bit.

In response to the final 0-to-1 transition in the downstream activation bit received from the 3-DSO link (from the beginning of the ET-initiated start-up the downstream activation bit across the 3-DSO link has experienced the following state transitions: 0→1→0→1), MCU 40 of LULT 24 generates an Activation Complete AC command to the U-chip 30 of LULT 24. The U-chip 30 in LULT 24 responds by sending an SL3 pulse pattern with the downstream activation bit across the DSL equal to 1 to the U-chip 30 of NT 27. In response to the downstream activation bit equal to 1 being received by the NT 27 after the upstream activation bit has been set by the NT 27 equal to '1', the NT 27 signals the T-interface that transparency has been established through all transmission segments in both directions up to the ISDN switch.

It should be noted in FIG. 3 that the downstream activation bit towards the NT 27 is never set to '1' until the upstream DSLs are fully started-up in both directions.

Referring to FIG. 4, there is shown the start-up procedure when activation is initiated by the customer at the NT. The sequences performed in the DSLs are similar to those of FIG. 3, but differ in that DSL 26 is first activated completely, thereafter DSL 16 is fully activated, after which the ACT bit is provided in the downstream direction to the NT to activate full transparency of the ISDN Basic Access path.

Thus, the present invention provides a procedure for the activation of tandem digital subscriber lines which are separated by a carrier system 16. The procedure assures that the DSLs are both fully activated before the downstream activation bit to the NT is set to '1'.

I claim:

1. A method for activating tandem digital subscriber lines connected by a carrier system in a communication link connecting a switch and a network termination, said method comprising the steps of:

fully activating a first digital subscriber line, said first digital subscriber line being proximate the switch, in both upstream and downstream directions; and activating a second digital subscriber line, said second digital subscriber line being proximate the network termination, in the downstream direction after the first digital subscriber line is fully activated, whereby the network termination does not prematurely consider the communication link to be fully activated.

2. A method as described in claim 1, wherein the second digital subscriber line is activated in the upstream direction prior to activating the first digital subscriber line.

3. A method as described in claim 1, wherein each digital subscriber line is activated in an upstream direction prior to being activated in a downstream direction.

4. A method as described in claim 1, wherein activation is initiated by the switch, and said method additionally comprising the steps of:

conveying an activation request from the switch downstream to the second digital subscriber line;

activating the second digital subscriber line in the upstream direction;

activating the first digital subscriber line in the upstream direction;

activating the first digital subscriber line in the downstream direction; and activating the second digital subscriber line in the downstream direction.

5. A method as described in claim 1, wherein activation is initiated by the network termination, said method additionally comprising the steps of:

activating the second digital subscriber line in the upstream direction;

activating the first digital subscriber line in the upstream direction;

activating the first digital subscriber line in the downstream direction; and activating the second digital subscriber line in the downstream direction.

6. A method as described in claim 1, additionally comprising the step of conveying bidirectionally activation indication bits across the digital subscriber lines to indicate an activation status of the digital subscriber lines in each direction.

7. A method as described in claim 6, additionally comprising the step of conveying bidirectionally activation information across the carrier system.

8. A method as described in claim 7, wherein the activation information is conveyed in a bit transported across the carrier system.

9. A method as described in claim 8, wherein the communication link provides basic rate ISDN access, and the carrier system employs the 3-DSO TDM method for ISDN basic rate transport.

10. A method as described in claim 1, wherein the digital subscriber lines are controlled by line units located in the switch, in the network termination, and in network elements interfacing the digital subscriber lines and the carrier system, each line unit including a microcontroller responsive to activation information received from the carrier system and the digital subscriber line and associated network element with which it is interfaced and responsive to the status of the associated network element for controlling the activation of the associated digital subscriber line.

11. A method as described in claim 10, wherein the microcontroller initiates a routine including the steps of:

determining if it is located on the downstream or upstream end of a digital subscriber line;

determining if an activation request was initiated by the switch or the network termination; and initiating one of a selected number of sub-routines depending upon the previous determinations.

12. A method as described in claim 11, additionally comprising the steps of:

conveying bidirectionally activation bits across the digital subscriber lines to indicate the activation status of the digital subscriber line in each direction; and conveying bidirectionally activation information across the carrier system.

13. A method as described in claim 12, wherein the microcontroller unit determines that it is in a line unit at the downstream end of a digital subscriber line and that activation has been initiated by the network termination, said microcontroller initiating a sub-routine comprising the steps of:

activating the first digital subscriber line;

setting the upstream activation bit to an active state;

detecting a downstream activation bit having an active state; and setting a downstream activation information signal to be sent over the carrier system of an active state to signify the activation of the first digital subscriber line in both the upstream and downstream directions.

14. A method as described in claim 12, wherein the microcontroller determines that it is located in a line unit at a downstream end of a digital subscriber line and activation has been initiated by the switch, said microcontroller initiating a sub-routine comprising the steps of:

initiating the activation of the first digital subscriber line;

detecting that the activation of the first digital subscriber line is pending;

setting a downstream activation information signal to be sent over the carrier system to an active state to indicate that the first digital subscriber line activation has been initiated;

detecting an activation information signal from the carrier system indicating that the second digital subscriber line has been activated in the upstream direction;

setting the upstream activation bit of the first digital subscriber line to an active state;

detecting a downstream activation bit in the first digital subscriber line indicating an active state; and setting a downstream activation information signal to be sent over the carrier system to an active state.

15. A method as described in claim 12, wherein the microcontroller determines that it is in a line unit at an upstream end of a digital subscriber line and that activation has been initiated by the switch, said microcontroller initiating a sub-routine comprising the steps of:

initiating the activation of the second digital subscriber line;

detecting an upstream activation bit set to the active state in the second digital subscriber line;

setting an upstream activation information signal to be sent over the carrier system to an active state;

detecting a downstream activation information signal from the carrier system in the inactive state;

detecting a downstream activation information signal from the carrier system in the active state; and setting an activation bit to the active state in the downstream direction over the second digital subscriber line.

16. A method as described in claim 12, wherein the microcontroller determines that it is in a line unit located at an upstream end of a digital subscriber line and that activation has been initiated by a network termination, said microcontroller initiating a sub-routine comprising the steps of:

initiating activation of the second digital subscriber line;

detecting an upstream activation bit indicating an active state in the second digital subscriber line;

setting an upstream activation information signal to be sent over the carrier system to an active state;

detecting a downstream activation information signal having an inactive state from the carrier system;

detecting a downstream activation information signal having an active state from the carrier system; and setting the activation bit in the downstream direction in the second digital subscriber line to the active state.

* * * * *